United States Patent [19]

Storace

[11] Patent Number: 4,811,234

[45] Date of Patent: Mar. 7, 1989

[54] POSTAGE METER RECHARGING SYSTEM

[75] Inventor: Anthony Storace, Norwalk, Conn.

[73] Assignee: Pitney Bowes Inc., Stamford, Conn.

[21] Appl. No.: 850,477

[22] Filed: Apr. 10, 1986

[51] Int. Cl.[4] ........................ G06F 15/00; G06F 15/22

[52] U.S. Cl. ................................ 364/464.02; 364/900

[58] Field of Search ............... 364/466, 464, 405, 406, 364/900; 380/23, 24, 25; 235/375; 340/825.34

[56] References Cited

U.S. PATENT DOCUMENTS

| | | | |
|---|---|---|---|
| 4,097,923 | 6/1978 | Eckert | 364/900 |
| 4,376,299 | 3/1983 | Rivest | 364/900 |
| 4,383,298 | 5/1983 | Huff et al. | 364/403 |
| 4,760,532 | 7/1988 | Sawsone et al. | 380/23 |

*Primary Examiner*—Parshotam S. Lall
*Assistant Examiner*—Ellis B. Ramirez
*Attorney, Agent, or Firm*—Michael J. DeSha; David E. Pitchenik; Melvin J. Scolnick

[57] ABSTRACT

An electronic postage meter system in which an electronic postage meter is coupled to a data center by way of a communication path to enable recharging of the postage meter. The postage meter includes a register having stored therein the amount of postage which the postage meter is authorized to print. The data center is responsive to a request for recharging the postage meter to indicate the time rate of reduction of the authorized value stored in the postage meter register.

5 Claims, 7 Drawing Sheets

REMOTE ACCOUNTING ROUTINE

POSTAGE METER RECHARGING SYSTEM

FIELD OF THE APPLICATION

The present invention relates to a postage meter recharging system and to a postage meter adapted for such recharging.

BACKGROUND OF THE INVENTION

Postage meter devices have found wide application in many businesses. The device prints a standard unit of value for governmental or private carrier delivery of parcels and mail. It is understood that the term "postage meter" also includes other like devices which provide a unit value metering capability.

One of the chief disadvantages of the postage meter devices as they are utilized today is the problem of recharging the postage meter with funds to be metered. At present, postal regulations require that the funds be prepaid before metering commences. This requirement results in a postage meter being physically taken to a post office facility for recrediting or there being means for obtaining a remote recrediting of the meter device.

Various schemes have been devised and implemented to obtain the desired remote recrediting based on information from a remote accounting station. Typical configurations are shown in U.S. Pat. No. 3,792,446 to McFiggans, et. al. entitled "REMOTE POSTAGE METER RESETTING METHOD" and in U.S. Pat. No. 4,097,923 to Eckert, Jr., et. al. entitled "POSTAGE METER CHARGING SYSTEM USING AN ADVANCED MICROCOMPUTERIZED POSTAGE METER". These patents teach a data center which is equipped with a programmed digital computer and a voice answer-back unit to process telephone calls from users of postage meters equipped either with a combination lock such that the lock prohibits recharging of the associated meter until it is unlocked or, in the case of U.S. Pat. No. 4,097,923, of a working memory which contains a seed number for generating postage funding combinations to unlock the meter. The remote system of the latter patent includes the capability of adding variable amounts of postage to the postage meter. The teaching of U.S. Pat. No. 3,792,446 relate only to the addition of a fixed increment to the meter.

U.S. Pat. No. 3,255,439 to Simjian discloses a system in which the meter communicates directly to a central accounting station for accounting for each and all of the metering operations either on a real time basis or in batches. Similar systems are disclosed for instance in West German Patent Application No. DE 2636852 published Feb. 23, 1978 in which a data transmitting unit is employed to recharge the postage meter by way of telephone or telegraph lines. U.K. Application No. 2,147,853 published May 22, 1985 further discloses a telephone integrated with a mail franking device which will operate as either a telephone or a postage meter. The telephone key pad may used to set postal values and it is disclosed that the accounting may be done either in the device or in a central accounting unit.

Each of the devices is limited in that there are required a number of complex operations in order for the user of the postage meter to assure that there are funds in the meter to be dispensed. In every case in the known postage meters, where the meter funds are required to be updated, it is up to the user to realize that the funds in the meter are low and that the user should initiate a telephone call or take the meter to the Post Office in order to recredit the meter. In many cases, a low funds event may occur as the user is in the midst of a mailing run. Because the prior art devices typically have a lockout feature to prevent meter operation when the funds get too low, the user is unable to continue with postage metering operations. In such cases, the user experiences dissatisfaction because one of the reasons for utilizing the remote recharging features of the postage meter is to eliminate the problem of having to go to the Post Office and to be able to obtain postage as needed.

Another difficulty in present postage meters is the general lack of convenient economical means for determining the rate of usage of the postage meters.

SUMMARY OF THE INVENTION

In accordance with one embodiment of the invention, a postage meter monitors the funds remaining in its descending register and whenever the value reaches a predetermined level, an automatic dialing device establishes communication to initiate a funds transfer. An account corresponding to the postage meter is maintained at a remote accounting data center such as a bank. Once communication to the remote accounting center is established, the account of the postage meter user is verified to assure that sufficient funds are available for transfer to the postage meter. In the event that the account is verified as proper, a signal, preferably recrediting data encrypted to prevent fraud, is transmitted to the postage meter to update the credit register. Preferably, the predetermined threshold is selectable by the user to match his expected use of postage. For best results, the meter stores the signal indicating the necessity for recrediting of the register and communicates during an offpeak period such as nighttime when the cost of telephone communications are lower and when the data center can be expected to encounter much less demand on its facilities. The calls from various postage meters may be staggered in order to avoid overloading the system. To ensure the integrity of the recharging operation, provision is made upon calling the data center to ascertain the identity of the calling meter location and then to break the connection and for the data center to immediately redial the location. Upon connection the meter at the called location is polled for identification and the responding code compared with the prestored identity of the meter at such location. In response to verification, the meter funding register is then activated as described above. These verification operations take place in a manner requiring no user intervention and thus are completely transparent to the user.

Preferably, the communications are established through a telephone exchange utilizing dual tone multi-frequency generators and receivers for decoding the data communicated between the meter and remote accounting center. It will be understood that conventional communication through MODEM connections are also contemplated. For best results, the data is encrypted in both directions in order to block fraudulent attempts to recredit the register.

In accordance with a further feature of the invention, the data center for receiving the accounting information from the postage meter, by way of the communication path, includes a program for analyzing the use of the meter, i.e., the time rate of change of authorized funding for the postage meter. For this purpose, the data is preferably provided with non-volatile memory for storing the funding data, and identity of a postage meter each time it is received. Based upon this information, the data center determines the amount of postage that has been printed by the meter between successive recharges thereof, to provide an indication of the usage of the meter. This information is of value to the postage meter user for several reasons. Thus, the determined rate of change provides an indication to the user of the schedule that must be employed in order to maintain adequate funds available for the recharging of the meter. In addition, the information is of value in ascertaining the adequacy of the capabilities of a postage meter currently being employed, i.e., whether the expected life of a meter currently in use is adequate to serve the users needs.

It is therefore an object of the invention to provide a postage meter recharging system that is transparent to the postage meter user. It is a further object to provide a postage meter recharging system which will provide communication with the data center at a lower cost to the postage meter user and at a predetermined level of funds in the meter, preferably selectable by the user.

DESCRIPTION OF THE DRAWING

In order that the invention will be more clearly understood, it will now be disclosed in greater detail with reference to the accompanying drawings wherein.

DESCRIPTION OF THE PREFERRED EMBODIMENT

Figure 1:
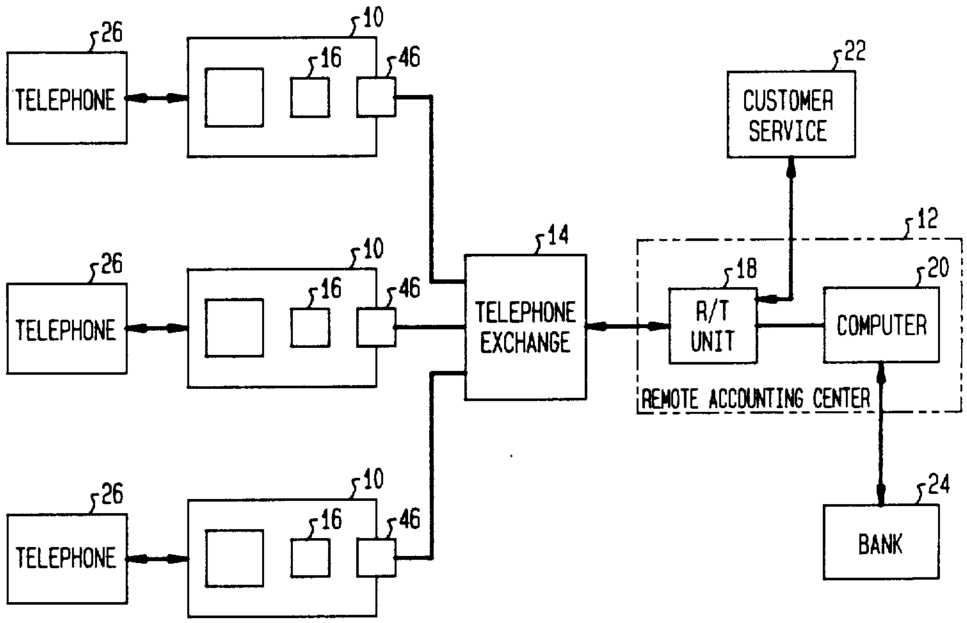
FIG. 1 is a block diagram of a postage meter recharging system in accordance with the invention.

Referring now to FIG. 1, a schematic block diagram of the remote meter funding system of this invention is shown. A plurality of blocks 10 represent postage meter stations capable of communicating with a data center or remote accounting station represented by block 12. The postage meter stations communicate with remote accounting center 12 via telephone exchange equipment generally illustrated by block 14. The transmitter-receiver 16 at each station 10 is preferably a DTMF generator-receiver combination such as for example, Motorola MC 14410 DTMF Generator and GTE G8870A DTMF Receiver.

Data center 12 includes a similar generator-receiver shown at 18. This generator-receiver 18 will receive frequency encoded data input from the transmitter-receiver combination 16 at any of the stations 10 and transform this input into a suitable, machine language for a programmed or special purpose digital computer 20. The computer 20 may be, for example, a Data General "Nova". The computer in turn communicates back to the particular postage meter station 10 via the communication line established, by the telephone exchange equipment. It will appreciated that communication between each postage meter station and the remote accounting center could be by way of a MODEM as is well known in the art of computer communication.

The data center 12 is shown in conjunction with a customer service facility 20 for providing human communication, if required, to the user of the postage meter station 10 in order to provide help or information. In one embodiment of the charging system in accordance with the invention, the data center 12 may be in communication with a remote banking facility 24 to provide a funds transfer between an account maintained at the banking facility 24 and the remote accounting center 12. Typically, the postal meter station 10 will be used in conjunction with a conventional telephone handset 26 coupled thereto.

Figure 2:
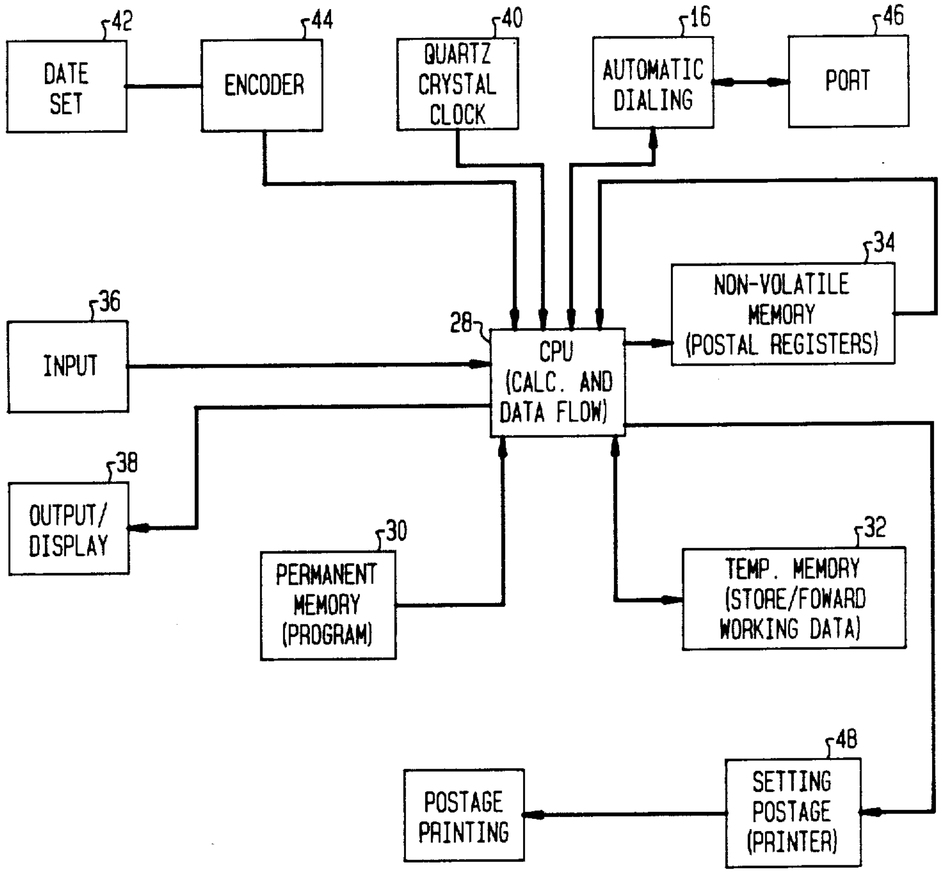
FIG. 2 is a block diagram of a postage meter in accordance with the invention.

Referring now to FIG. 2, the general functional arrangement of the computerized postage meter station 10 of the present invention is illustrated.

Electronic postage meters are known and are described, for instance, in U.S. Pat. No. 3,978,457 for MICROCOMPUTERIZED ELECTRONIC POSTAGE METER SYSTEM and in U.S. Pat. No. 4,301,507 for ELECTRONIC POSTAGE METER HAVING PLURAL COMPUTING SYSTEMS, the disclosures of which are specifically incorporated by reference herein.

The heart of the system is the CPU or microprocessor 28 and it performs two basic functions: performance of calculations based on input data and controlling the flow of data between various memory units. Three basic memory units are employed with the CPU 28. The first is the ROM or permanent memory 30 which as is well known is a non-alterable memory storing the specific sequence of operations for performing postal data calculations in accordance with certain predetermined inputs as well as performing other routines for operating the system. The second memory unit is a temporary memory, RAM 32 which interacts with the CPU 28 for forming a temporary storage, holding and forwarding working data in accordance with the calculations being performed by the CPU 28. An additional memory component, NVM 34 which may be a battery backed RAM or other memory capable of long term storage of data is also coupled to the CPU 28. It will be understood that the data calculation may be performed and stored in battery backed RAM or an appropriate NVM of other known types. The NVM 34 is a non-volatile memory which acts to store certain critical information employed in the postal system. Information stored in the temporary memory 32 which represents crucial accounting functions such as descending balances in a descending register or ascending credits in an ascending register and the like are stored in the nonvolatile memory 34 wherein they may be held while the machine is deenergized and then recalled upon a subsequent start-up. In this manner, the computer system may continually act upon these balances in the temporary memory 32 without fear of loss of this information upon shutdown.

Further, the information may be recalled on reactivation by start-up by retrieving it from the nonvolatile memory 34. The nonvolatile memory is shown as coupled to the CPU and deriving an output therefrom in accordance with the transfer of information from the temporary storage 32 under the control of the permanent memory 30 through the CPU 28. The nonvolatile memory 34 is also shown as providing an output line coupled back into the CPU 28 for transferring the data back into and through the CPU 28 and into the temporary memory 32 in accordance with the start-up routine under the control of the permanent memory 30.

The system operates in accordance with data applied from an appropriate input means 36. It will appreciated that the input means may include mechanical print value setting devices and switches in place of or in addition to a keypad. This data is fed into the CPU 28 under control of the program in the permanent memory 30. At any time during the operation of the system, the contents of the temporary memory 32 storing the appropriate credit, debit, balances, or other accumulations in accordance with the various features of the system could be made available by any appropriate instruction provided by the input means 36 or communicated to the meter. This causes the CPU 28 to access the desired location in temporary memory 32, thereby storing the information requested. The information may also be provided through the CPU 28 into the output display unit 38.

Further in accordance with the invention, there is shown a clock 40 connected to the CPU for the purpose of providing time and date information to the CPU. Such clocks are well known and may comprise for instance an LSI logic circuit in combination with a quartz-crystal controlled oscillator. In connection therewith, there is provided a timeout device coupled to the clock 40 and the CPU 28. The timeout device operates to measure the time during which the meter is without power. Since the meter of the present invention is designed to be operative only at one specific location, it is assumed that an inordinate time without power may be indicative of an attempt to change the location of the meter. The use of the timeout signal will be explained further below. The dater wheels indicated at 42, which are typically positioned manually, have encoders 44 coupled thereto which provide date wheel positioning information to the CPU. A suitable arrangement is shown for example in U.S. Pat. No. 4,060,720 to Check specifically incorporated by reference herein.

As previously described with respect to FIG. 1, a DTMF Transmitter and Receiver combination 16 is coupled to the CPU and to an output port 46 for establishing communication and for communications between the remote accounting center and the CPU under the control of the CPU or the remote accounting center.

Figure 3:
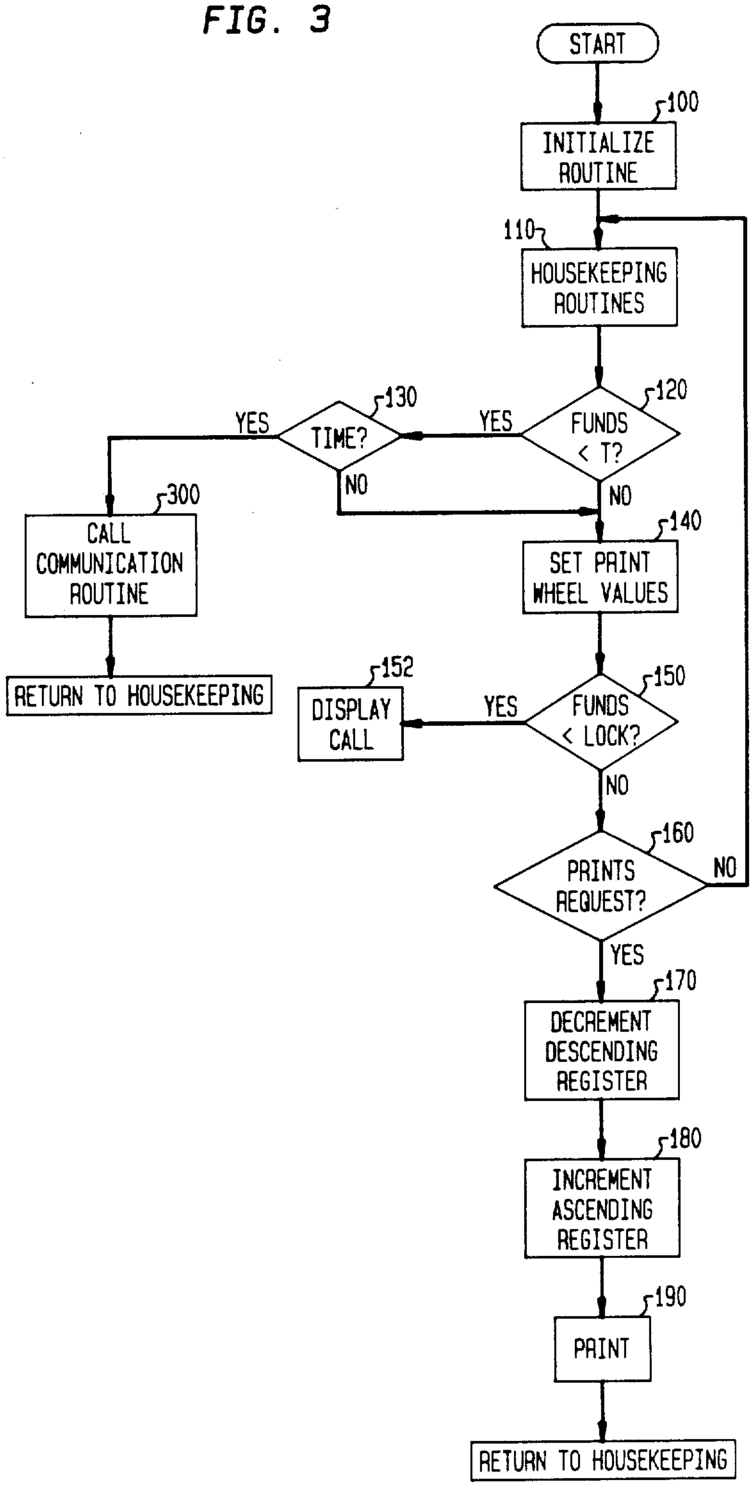
FIG. 3 is a flow chart of the operation of the postage meter.

FIG. 3 illustrates in a flow chart the operation of a postage meter in accordance with the invention. Once the postage meter station 10 is installed, the meter program proceeds through its initializing routines shown at block 100. Thereafter as described more fully below the meter will continuously loop through its routines to check meter parameters and input conditions and to print postage as desired by the user.

As shown in block 110 the meter program proceeds through housekeeping routines such as those described for instance in U.S. Pat. No. 4,301,507 previously incorporated by reference for monitoring various meter conditions. The routine then proceeds to decision block 120 to check whether the funds in the descending register have been decremented to a predetermined threshold level. Preferably this threshold level is set in accordance with the user's desires. This may be accomplished either through preset values in the program stored in ROM or through communication between the installed meter and the remote accounting center.

Figure 4:
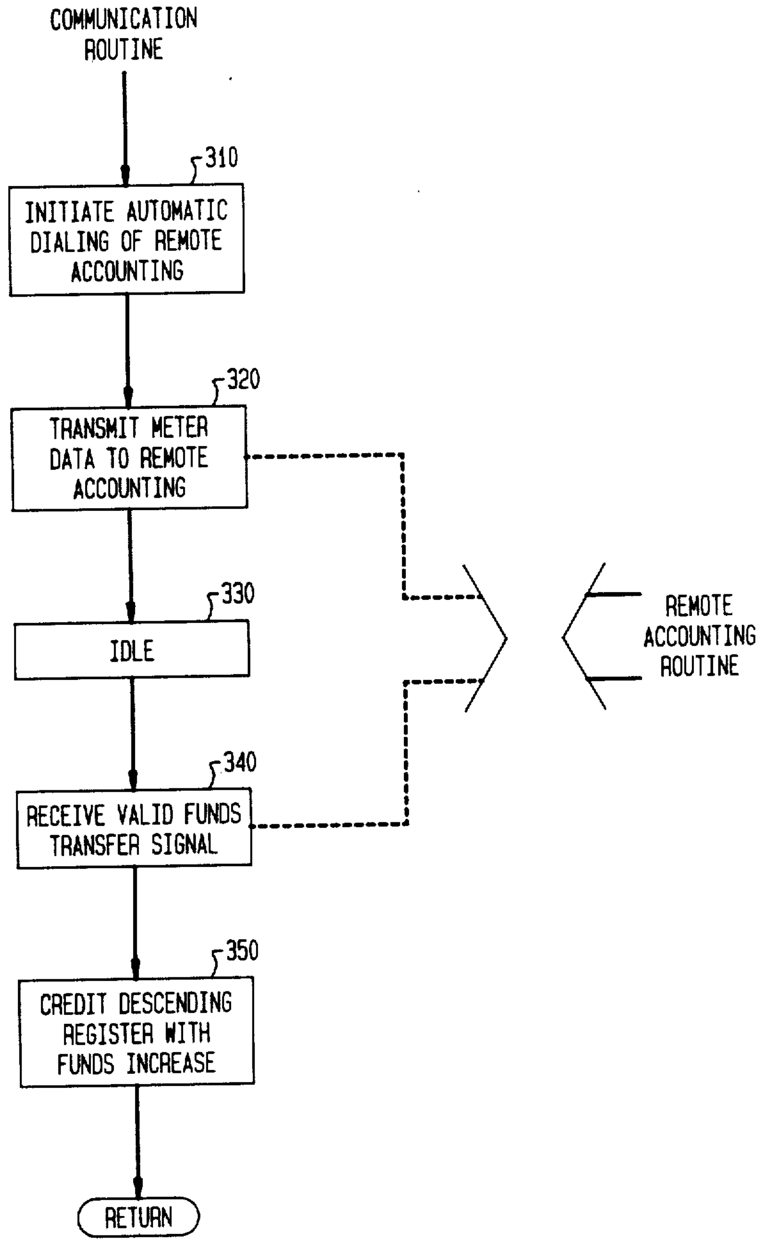
FIG. 4 is a flow chart of a communication routine for establishing communication between the postage meter and the remote accounting center.

If the threshold value has been reached further checks decision block 130 to determine if a predetermined time has been reached. If the time is appropriate, the communication routine shown as block 300 and described in conjunction with FIG. 4 is called and communication is established at port 46 through the telephone exchange to the remote accounting center 12. It will be appreciated that it is preferable that the calls which may be made to the remote accounting center be staggered in order that the center be able to accommodate the various postage meter stations. Accordingly the predetermined intervals may preset in the permanent program memory or may be downloaded to the postage meter station at the initial communication between the postage meter and the remote accounting center.

If however the threshold value has not been reached or the threshold was reached and funds have been recredited to the meter, the program proceeds to block 140 which is a routine to set print wheel value (in conjunction with block 48, FIG. 2). Typically the print wheels will remain set at the previously selected value since the majority of letters will probably not weigh more than that requiring the minimum postage. Known electronic postage meters conventionally use stepping motors for the purpose of setting the print wheels to a value commanded from a keyboard. The block 140 will also be understood to encompass the manual selection of printwheel positions through mechanical coupling between the setting means and the print wheels and the verification of each print wheel position.

At decision block 150 the value stored in the descending register is compared to a meter lockout value to determine for instance whether there are funds available for metering even though the predetermined recrediting threshold has been reached. If the meter lockout point has been reached the program branches to block 152 to display a message to the user, for example, "CALL CUSTOMER ASSISTANCE" or the like. When funds remain, the program decision block 160 checks to see if a postage printing has been commanded. If no printing has been initiated, the program loops back. If a print cycle has been requested, the descending register is decremented and the ascending register is incremented as illustrated in blocks 170 and 180. The program moved to block 190 where the printer prints the selected postal value and the program returns to block 110.

FIG. 4 is a flow chart of a communication routine called by the postage meter program in the event that funds in the descending register have been decremented to the previously set threshold value. The routine 310 signals the DTMF transmitter-receiver 16 to dial the preselected telephone number of the remote accounting center 12 and establishes communication between the postage meter and the remote accounting center. It will understood that various "handshaking" procedures are well known and may be utilized for establishing valid communication. Suitable protocols are described in U.S. Pat. No. 4,253,158 specifically incorporated herein by reference and in previously cited U.S. Pat. No. 4,097,923. As shown in block 320 the program falls to a transmit meter data information block. It will be appreciated by those skilled in the art that all of the required meter data can be transmitted to the remote accounting center in a group of tone signals or the information may be transmitted piecemeal in response to queries from the computer in the remote accounting center.

The program then remains in an idle loop 300 until the register recrediting data is received at block 340.

For best results the recrediting information transmitted by the remote accounting center to the postage meter must be encrypted to prevent fraudulent register updates being sent to the meter by unscrupulous partles. Accordingly, the block 340 also includes a routine for decrypting data that has been encrypted by the computer in the remote accounting center for transmission to the particular individual postage meter. A suitable encryption scheme is described for example in U.S. Pat. No. 3,792,446 specifically incorporated herein by reference.

Upon assuring that the meter has received proper and authentic register recrediting information from the remote accounting center, the program performs the update of the descending register at block 350 and returns to the main program illustrated in FIG. 3.

Figure 5:
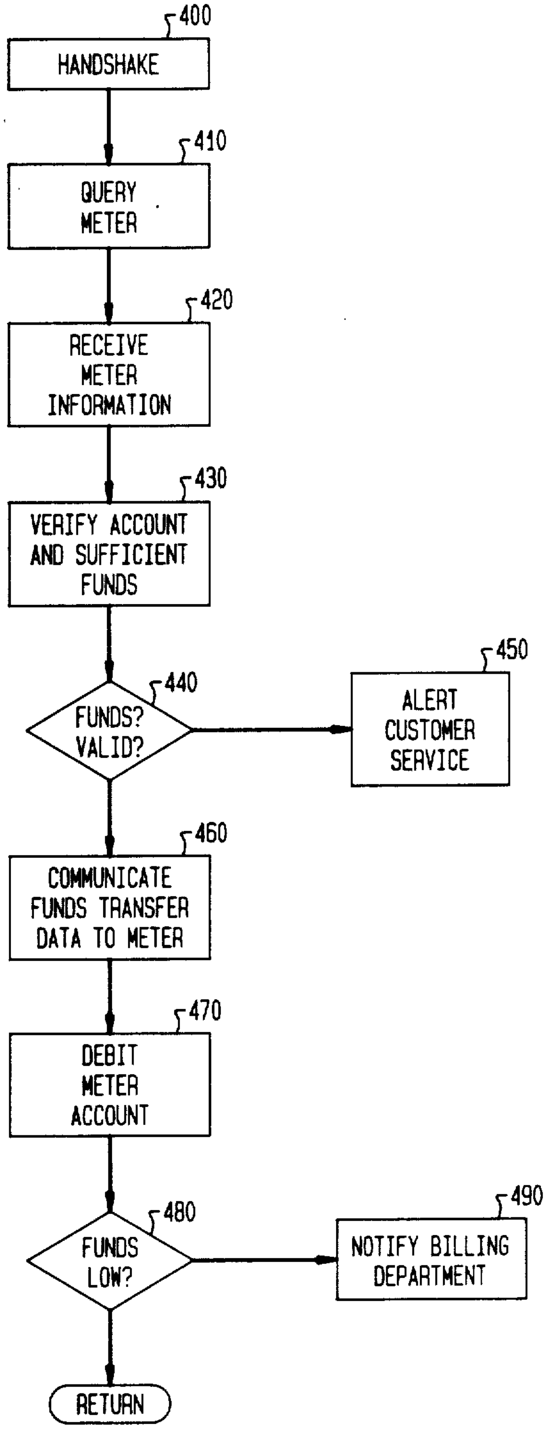
FIG. 5 is a flow chart of the operation of the equipment at the remote accounting data center.

FIG. 5 is a flow chart illustrating the sequence of operations carried on at the remote accounting center upon communication being established between the postage meter and the accounting center. The instant routine is initiated by a telephone connection being established between the postage meter and the remote accounting center. As described previously in connection with FIG. 4, the counterpart "handshake" is achieved in block 400. Once the communication is established, the program falls to block 410 to request the meter to transmit meter data to the computer. The data to be transmitted includes at least the mter I.D. number and the values in the descending and ascending registers in the meter.

The computer then proceeds to verify that the account is valid and that sufficient funds are available in decision block 440. If funds are not available the program branches to block 450 to alert customer service that there are no funds for transfer to this particular meter. Assuming that there are sufficient funds, register update information, preferable encrypted as descirbed above, is transmitted to the meter via the telephone connection, block 460. The user's account is debited, block 470, and if the funds available have reached a predetermined threshold level, decision block 480, customer billing is notified.

Figure 6:
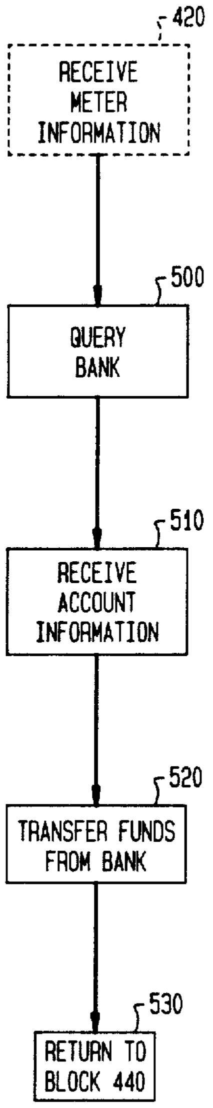
FIG. 6 is a flow chart of an alternate method of operation.

FIG. 6 shows an alternative method for maintaining the user's account. In accordance with this method the user's funds are maintained in a fund in a bank. Whenever the postage meter is to be recredited, the user's account is verified and the postage meter recrediting information is transmitted. The funds to cover the recrediting are transferred from the bank to the remote accounting center, block 520. The advantage of this arrangement is that the user's funds can be drawing interest instead of bein tied-up in the account for directly funding the meter.

Figure 7:
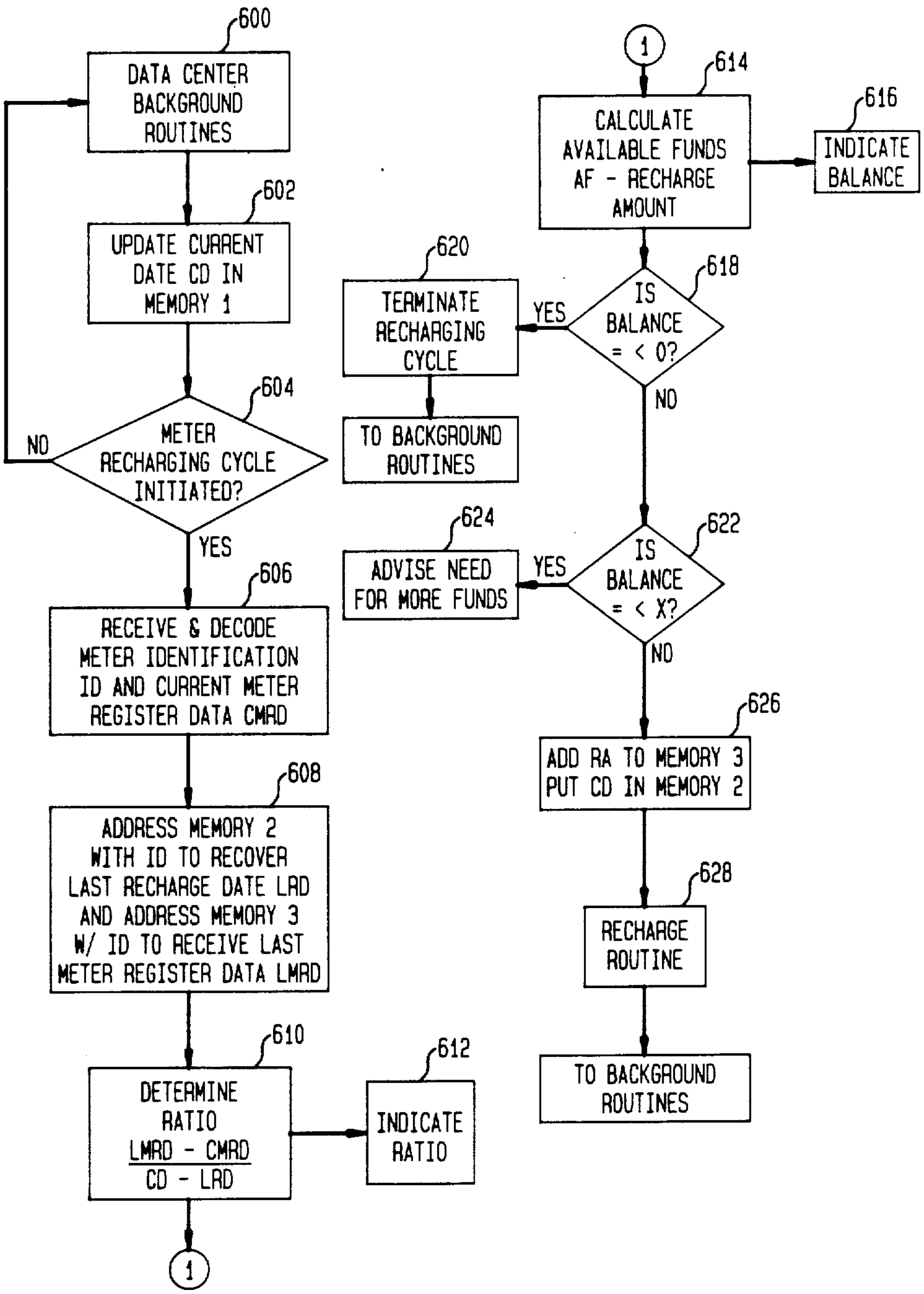
FIG. 7 is a flow diagram of a data center program in accordance with the invention.

Referring now to FIG. 7, therein is illustrated a flow diagram for the data center, for determining the rate of change of funding of the postage meter. Block 600 represents the background routines of the data center, the program periodically updating a date stored in a memory 1 at block 602 so that the current date is always present in this memory. The program loops if a postage meter recharging cycle has not been initiated, as shown by the test at block 604.

If a request has been made for recharging the postage meter, the signals from the communication path are received and decoded at block 606 to determine the identification of the postage meter as well as the current reading of the register of the postage meter. The program then proceeds, at block 608, to employ the decoded identification signals to recover the last recharge date from another memory, memory 2, as well as the last stored meter register data as stored in a memory, memory 3. The ratio of usage may be obtained from the available information in block 610 and, the ratio may be indicated at block 612.

The program may also be employed to determine if adequate funds are available, for example, in an interest bearing account, by determining if the recharging amount is less than the available funds, at block 614, the balance remain being indicated at block 616. If the balance is less than zero, as tested at block 618, the requested recharging cycle is terminated at block 620, with the user being advised, if desired, of the condition of inadequate funds. If adequate funds are available, but are lower than a determined amount X, as tested at block 622 the user may be advised at block 624, before proceeding to update the memories of the data center.

The memories of the data center are updated at block 626, to add the recharging amount to memory 3 and to put the current register reading in memory 2, so that the memories will be provided with the proper data for the next recharging cycle. The program then proceeds to effect the recharging of the postage meter at block 628, for example, by the technique discussed above.

This application incorporates certain material common to certain other applications. The subject matter of all of these applications is incorporated herein by reference. The applications, including the present case, are identified as follows: U.S. Ser. Nos. 850,479; 850,478; 850,477; 850,480 and 850,476

Other variations and modifications will be apparent to those skilled in the art.

What is claimed is:

1. An electronic postage meter system comprising a postage meter, a data path and a data center, said meter having a communication port coupled to said path, an accounting circuit including a descending register, and communication control means coupled to said accounting circuit for applying first signals to said communication port that are a function of the contents of said register, said control means comprising means responsive to the receipt of second signals from said port for modifying the contents of said register to correspond to a determined higher postage printing value authorization, said data center being coupled to said data path and comprising computer means responsive to receipt of said first signals from said path for indicating the time rate of reduction of values stored in said register.

2. An electronic postage meter system comprising a postage meter, a data path and a data center, said meter having a communication port coupled to said path, an accounting circuit including a descending register, and communication control means coupled to said accounting circuit for selectively applying dialling signals and coded identification signals to said communication port, said dialling signals corresponding to said data center, and said identification signals being a function of the contents of said register, said control means comprising means responsive to determined coded authorization signals from said port for modifying the contents of said register to correspond to a determined higher postage printing value authorization, said data center being coupled to said data path and comprising authorization means responsive to receipt of determined signals from said path for generating authorization signals for application to said path, means for decoding said coded identification signals for recovering signals corresponding to the contents of said register, and computer means responsive to the time of receiving said recovered signals for indicating the time rate of reduction of values stored in said register.

3. The electronic postage meter system of claim 2 wherein said means for selectively applying comprises means responsive to the reduction of the value stored in said register below a predetermined value for applying said dialling signals and coded identification signals to said communication port.

4. In a data center for receiving coded signals from a communication path corresponding to the identity and the amount of postage that a postage meter coupled to the communication path is authorized to print and for applying authorization signals to the communication path corresponding to modification of the amount of postage that the postage meter is authorized to print, the improvement wherein said data center further comprises computer means responsive to the receipt of said coded signals for decoding said signals to derive a value corresponding to said amount, and means responsive to said value and time of receipt for indicating the time rate of change of the amount that the postage meter is authorized to print.

5. A method for determining the rate of usage of funds of a postage meter, wherein the postage meter encorporates a register having stored therein a value corresponding to the amount of postage that the postage meter is authorized to print, said method comprising sending said value at a first time in the form of first coded signals to a data center via a communication path, decoding said first signal to derive the value stored in said register at said first time and storing it, sending said value stored in said register at a second time in the form of second coded signals to said data center via said communication path, decoding said signal at said data center to derive the values stored in said register at said second time, and deriving the time rate of change of the value stored in said register from said stored value and decoded second signal.

* * * * *